United States Patent
Büddefeld et al.

(10) Patent No.: US 12,387,614 B2
(45) Date of Patent: Aug. 12, 2025

(54) MICRO WEATHER RISK MAPPING FOR VERY LOW-LEVEL AERIAL VEHICLES

(71) Applicant: THE BOEING COMPANY, Chicago, IL (US)

(72) Inventors: Michael Christian Büddefeld, Hessen (DE); Hugo Eduardo Teomitzi, Hessen (DE)

(73) Assignee: THE BOEING COMPANY, Arlington, VA (US)

( * ) Notice: Subject to any disclaimer, the term of this patent is extended or adjusted under 35 U.S.C. 154(b) by 361 days.

(21) Appl. No.: 18/061,021

(22) Filed: Dec. 2, 2022

(65) Prior Publication Data

US 2024/0185731 A1 Jun. 6, 2024

(51) Int. Cl.
*G08G 5/76* (2025.01)
*G01W 1/10* (2006.01)
*G08G 5/20* (2025.01)

(52) U.S. Cl.
CPC ............ *G08G 5/76* (2025.01); *G01W 1/10* (2013.01); *G08G 5/20* (2025.01)

(58) Field of Classification Search
None
See application file for complete search history.

(56) References Cited

U.S. PATENT DOCUMENTS

| | | | |
|---|---|---|---|
| 8,302,025 B2 * | 10/2012 | Iwano | G01C 21/367 715/858 |
| 9,959,771 B1 | 5/2018 | Carlson | |
| 10,540,900 B2 | 1/2020 | Butler et al. | |
| 2009/0083657 A1 * | 3/2009 | Tsuji | G01W 1/02 715/781 |

(Continued)

FOREIGN PATENT DOCUMENTS

| CN | 110275224 A | 9/2019 |
|---|---|---|
| CN | 110941790 A | 3/2020 |

(Continued)

OTHER PUBLICATIONS

Extended European Search Report for application No. 23204325.7 dated Mar. 15, 2024, pp. 1-7.

*Primary Examiner* — Amelia Vorce
(74) *Attorney, Agent, or Firm* — Moore IP Law

(57) ABSTRACT

Micro-weather risk mapping for very low-level aerial vehicles includes receiving data indicating a first geographic area and obtaining meteorologic data for a second geographic area. The first geographic area is smaller than and entirely bounded by the second geographic area. Mapping includes determining topographic parameters associated with the first geographic area. Mapping includes performing a comparison of the topographic parameters associated with the first geographic area to topographic parameters associated with a plurality of predetermined micro-weather models. Mapping includes selecting a micro-weather model from among the plurality of predetermined micro-weather models based on the comparison. Mapping includes determining, based on the meteorologic data for the second geographic area and the micro-weather model, risk data indicative of risk of particular meteorological conditions in the first geographic area.

20 Claims, 6 Drawing Sheets

(56) References Cited

U.S. PATENT DOCUMENTS

| | | | | |
|---|---|---|---|---|
| 2010/0265125 | A1* | 10/2010 | Kelly | G01W 1/04 |
| | | | | 342/179 |
| 2014/0324351 | A1* | 10/2014 | Dannevik | G08B 21/10 |
| | | | | 702/3 |
| 2016/0350453 | A1* | 12/2016 | Walls | G06F 30/20 |
| 2017/0090069 | A1* | 3/2017 | Kirby | H04W 4/029 |
| 2017/0316510 | A1* | 11/2017 | Hertz | G08G 5/57 |
| 2019/0101934 | A1* | 4/2019 | Tuukkanen | G05D 1/101 |
| 2019/0147753 | A1* | 5/2019 | Hendrian | G08G 5/0039 |
| | | | | 701/14 |
| 2019/0271563 | A1* | 9/2019 | Pandit | G01W 1/10 |
| 2023/0408288 | A1* | 12/2023 | White | G01C 21/3691 |
| 2024/0230336 | A9* | 7/2024 | Ali | G06Q 10/047 |
| 2024/0337773 | A1* | 10/2024 | Imaki | G01W 1/00 |

FOREIGN PATENT DOCUMENTS

| | | | | |
|---|---|---|---|---|
| KR | 102304404 | B1 * | 9/2021 | G01P 5/00 |
| KR | 102352881 | B1 | 1/2022 | |

* cited by examiner

MICRO WEATHER RISK MAPPING FOR VERY LOW-LEVEL AERIAL VEHICLES

FIELD OF THE DISCLOSURE

The subject disclosure is generally related to micro weather risk mapping for very low-level aerial vehicles.

BACKGROUND

Atmospheric conditions affect all kinds of aerial vehicles. In urban air environments, small aerial vehicles operating below approximately 150 meters are subject to local and micro-scale wind effects of an urban canopy layer, which features complex atmospheric conditions due to direct interaction with local topology and other ground-based structures that effect formation of air flow and vorticity, as well as distribution of heat and humidity. The lower the operating altitude, the greater the impact of the urban canopy layer on the wind effects.

Urban boundaries and urban canopy layers include characteristics of highly diverse wind fields and turbulences that can severely affect the safety and efficiency of airborne vehicles. For example, it is estimated that commercial and military drone operators unnecessarily cancel or delay about 30% of all drone flights based on operator interpretations of urban boundaries and urban canopy layers.

Traditional microscale weather forecast models, including real-time or near real-time models, can require substantial computing resources, rendering them too inefficient for use by smaller aerial vehicle flights. Typical weather forecasts and reports are facilitated using a combination of local observation and computational calculation of wide-range physical models. The classic numerical calculations to generate weather forecasts and reports are time intensive and computing power intensive, and usually repeated in a given period. A high level of detail and additional environmental complexity—such as buildings in the urban canopy layer, low scale topology, or micro-climatic effects—can lead to an exponential increase of computing cost. Additionally, resource constraints are incompatible with the short lead times required for reliable forecasts of atmospheric conditions. Further, it is currently unclear if established modelling procedures can be transformed and efficiently applied to a microscale environment.

Some approaches to downscaling existing regional weather reports, such as "model output statistics," are not applicable in the context of very low-level flight planning. The model output statistics approaches rely on local observation stations to train a regression model that adjusts regional model outputs. Such observation stations can only be installed close to structures instead of flyable, open space. The idea of creating model output statistics with unmanned aerial vehicles as nodes is also not feasible because drones usually fly when the conditions are safe, and weather forecasts are most effective for operational purposes when the weather is non-ideal. In consequence, data points for the most critical situations are missing.

SUMMARY

In a particular implementation, a method includes receiving data indicating a first geographic area. The method includes obtaining meteorologic data for a second geographic area. The first geographic area is smaller than and entirely bounded by the second geographic area. The method includes determining topographic parameters associated with the first geographic area. The method includes performing a comparison of the topographic parameters associated with the first geographic area to topographic parameters associated with a plurality of predetermined micro-weather models. The method includes selecting a micro-weather model from among the plurality of predetermined micro-weather models based on the comparison. The method also includes determining, based on the meteorologic data for the second geographic area and the micro-weather model, risk data indicative of risk of particular meteorological conditions in the first geographic area.

In another particular embodiment, a non-transient, computer-readable medium stores instructions that, when executed by one or more processors, cause the one or more processors to initiate, perform, or control operations including receiving data indicating a first geographic area. The operations include obtaining meteorologic data for a second geographic area, wherein the first geographic area is smaller than and entirely bounded by the second geographic area. The operations include determining topographic parameters associated with the first geographic area. The operations include performing a comparison of the topographic parameters associated with the first geographic area to topographic parameters associated with a plurality of predetermined micro-weather models. The operations include selecting a micro-weather model from among the plurality of predetermined micro-weather models based on the comparison. The operations also include determining, based on the meteorologic data for the second geographic area and the micro-weather model, risk data indicative of risk of particular meteorological conditions in the first geographic area.

In another particular embodiment, a device includes means for receiving data indicating a first geographic area. The device includes means for obtaining meteorologic data for a second geographic area, wherein the first geographic area is smaller than and entirely bounded by the second geographic area. The device includes means for determining topographic parameters associated with the first geographic area. The device includes means for performing a comparison of the topographic parameters associated with the first geographic area to topographic parameters associated with a plurality of predetermined micro-weather models. The device includes means for selecting a micro-weather model from among the plurality of predetermined micro-weather models based on the comparison. The device also includes means for determining, based on the meteorologic data for the second geographic area and the micro-weather model, risk data indicative of risk of particular meteorological conditions in the first geographic area.

In another particular implementation, a system includes a memory configured to store instructions and one or more processors configured to receive data indicating a first geographic area. The one or more processors are configured to obtain meteorologic data for a second geographic area, wherein the first geographic area is smaller than and entirely bounded by the second geographic area. The one or more processors are configured to determine topographic parameters associated with the first geographic area. The one or more processors are configured to perform a comparison of the topographic parameters associated with the first geographic area to topographic parameters associated with a plurality of predetermined micro-weather models. The one or more processors are configured to select a micro-weather model from among the plurality of predetermined micro-weather models based on the comparison. The one or more processors are configured to determine, based on the meteorologic data for the second geographic area and the micro-weather model, risk data indicative of risk of particular meteorological conditions in the first geographic area.

The features, functions, and advantages described herein can be achieved independently in various implementations or can be combined in yet other implementations, further details of which can be found with reference to the following description and drawings.

DETAILED DESCRIPTION

In order to appropriately account and prepare for atmospheric conditions in very low-level airspace operations, aerial vehicle operators can attempt to downscale typical mesoscale wind information available to operators of larger aircraft. The systems and methods described herein apply hyperlocal wind information for regionally common wind-speeds and directions to identify similar patterns in forecast or real-time environments. By analyzing the identified patterns, the systems and methods disclosed herein can generate a local mapping of differently weighted risk zones. The local mapping can be used to determine whether to launch an aerial vehicle, can enable an automated path planning process to reduce atmospheric impact on flights of the aerial vehicle, can determine where to land the aerial vehicle, can enable flight path management that can optimize usage of different layers of the airspace, or combinations thereof. This can include, in a particular aspect, accounting for the individual constraints of the aerial vehicle.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 1:
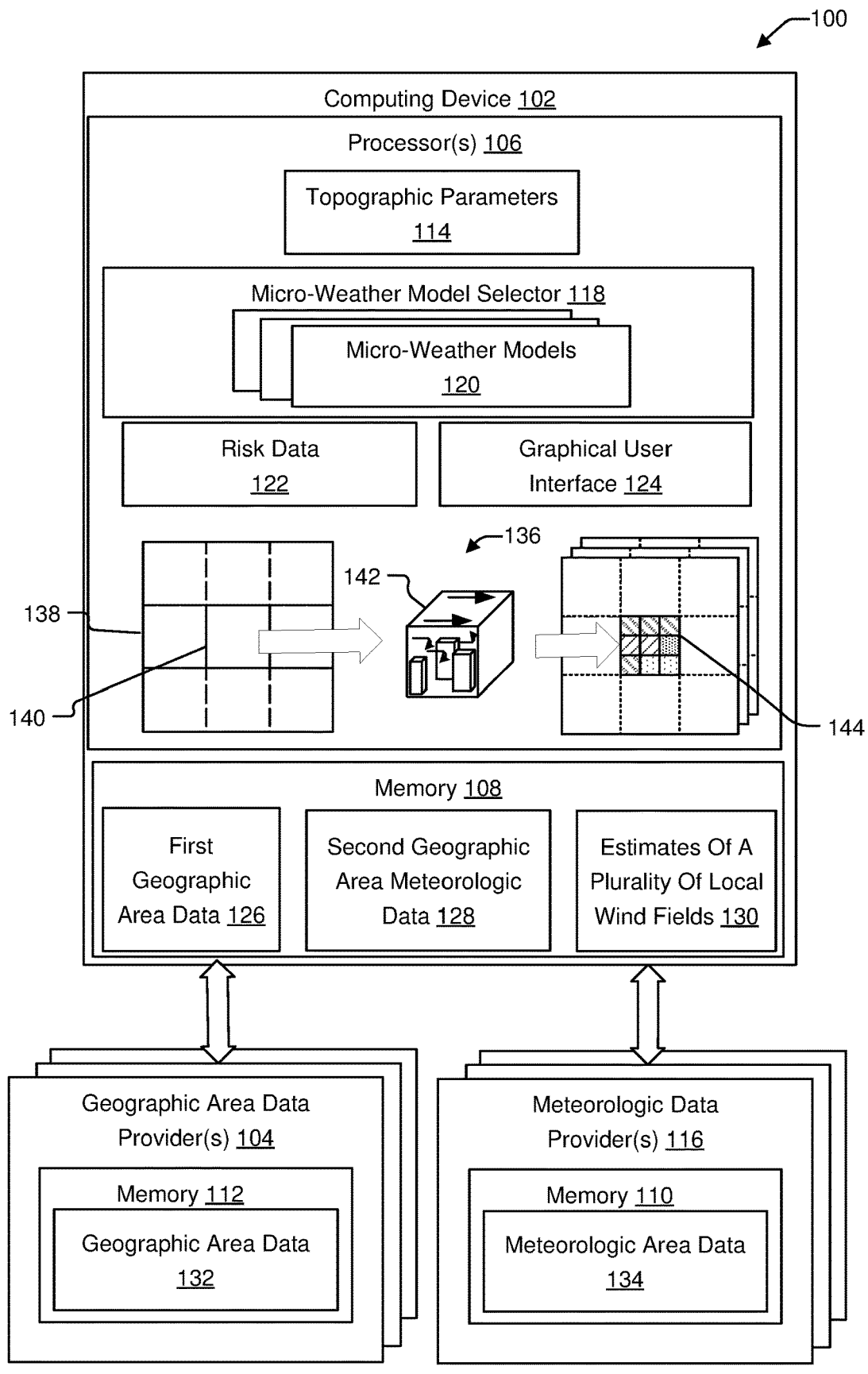
FIG. 1 depicts an example system for micro-weather risk mapping for very low-level aerial vehicles, in accordance with at least one implementation of the subject disclosure.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a." "an," and "the" are intended to include the plural forms as well, unless the context clearly indicates otherwise. Further, some features described herein are singular in some implementations and plural in other implementations. To illustrate, FIG. 1 depicts a system 100 including one or more processors ("processor(s)" 106 in FIG. 1), which indicates that in some implementations the system 100 includes a single processor 106 and in other implementations the system 100 includes multiple processors 106. For ease of reference herein, such features are generally introduced as "one or more" features and are subsequently referred to in the singular unless aspects related to multiple of the features are being described.

The terms "comprise." "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first." "second." "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating." "calculating." "using." "selecting." "accessing," and "determining" are interchangeable unless context indicates otherwise. For example, "generating," "calculating." or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled." or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

As used herein, the term "machine learning" should be understood to have any of its usual and customary meanings within the fields of computers science and data science, such meanings including, for example, processes or techniques by which one or more computers can learn to perform some operation or function without being explicitly programmed to do so. As a typical example, machine learning can be used to enable one or more computers to analyze data to identify patterns in data and generate a result based on the analysis. For certain types of machine learning, the results that are generated include a data model (also referred to as a "machine-learning model" or simply a "model"). Typically, a model is generated using a first data set to facilitate analysis of a second data set. For example, a first portion of a large body of data may be used to generate a model that can be used to analyze the remaining portion of the large body of data. As another example, a set of historical data can be used to generate a model that can be used to analyze future data. Examples of machine-learning models include, without limitation, perceptrons, neural networks, support vector machines, regression models, decision trees, Bayesian models, Boltzmann machines, adaptive neuro-fuzzy inference systems, as well as combinations, ensembles and variants of these and other types of models. Variants of neural networks include, for example and without limitation, prototypical networks, autoencoders, transformers, self-attention networks, convolutional neural networks, deep neural networks, deep belief networks, etc. Variants of decision trees include, for example and without limitation, random forests, boosted decision trees, etc.

Since machine-learning models are generated by computer(s) based on input data, machine-learning models can be discussed in terms of at least two distinct time windows—a creation/training phase and a runtime phase. During the creation/training phase, a model is created, trained, adapted, validated, or otherwise configured by the computer based on the input data (which in the creation/training phase, is generally referred to as "training data"). Note that the trained model corresponds to software that has been generated and/or refined during the creation/training phase to perform particular operations, such as classification, prediction, encoding, or other data analysis or data synthesis operations. During the runtime phase (or "inference" phase), the model is used to analyze input data to generate model output. The content of the model output depends on the type of model. For example, a model can be trained to perform classification tasks or regression tasks, as non-limiting examples. In some implementations, a model may be continuously, periodically, or occasionally updated, in which case training time and runtime may be interleaved or one version of the model can be used for inference while a copy is updated, after which the updated copy may be deployed for inference.

FIG. 1 depicts an example system 100 for micro-weather risk mapping for very low-level aerial vehicles, in accordance with at least one implementation of the subject disclosure. In some implementations, the system 100 includes a computing device 102 configured to communicate with one or more geographic area data providers 104, one or more meteorological data providers 116, or some combination thereof.

In some implementations, the geographic area data provider(s) 104 can include a memory 112. The memory 112 can have stored thereon a variety of data and data types including, for example, geographic area data 132. In some aspects, the geographic area data 132 can include one or more data values associated with one or more geographic areas. The data values can include, for example, data values indicating the location and size of a particular geographic area (e.g., through a plurality of latitude and longitude coordinates), topographical features of the particular geographic area (e.g., elevation, natural features, buildings, etc.), etc. In a particular aspect, the geographic area data 132 can include a superset of information from which is gathered, calculated, analyzed, and/or otherwise derived topographic parameters 114 associated with a particular geographic area, a first geographic area data 126, or some combination thereof, as described in more detail below.

In some implementations, the meteorological data provider(s) 116 can include a memory 110. The memory 110 can have stored thereon a variety of data and data types including, for example, meteorological area data 134. In some aspects, the meteorological area data 134 can include one or more data values associated with one or more geographic areas. The data values can include, for example, data values indicating wind speed, wind direction, temperature, barometric pressure, etc. for the one or more geographic areas. In a particular aspect, the meteorological area data 134 is mesoscale meteorological data applicable to a relatively large geographic area. The mesoscale data can, in some configurations, be identified as applicable to one or more smaller geographic areas within the relatively large geographic area. In the same or alternative particular aspects, the meteorological area data 134 can include a superset of information from which is gathered, calculated, analyzed, and/or otherwise derived meteorological data for a particular geographic area (e.g., second geographic area meteorological data 128, as described in more detail below).

The computing device 102 can include one or more processors 106 coupled to a memory 108. The processor(s) 106 are configured to receive data from the geographic area data provider(s) 104, the meteorological data provider(s) 116, or some combination thereof. In some aspects, data indicating a first geographic area can be received from the geographic area data provider(s) 104 and stored as the first geographic area data 126 at the memory 108. As noted above, the data indicating the first geographic area can include data indicating the location and size of the first geographic area (e.g., through a plurality of latitude and longitude coordinates), topographical features of the first geographic area (e.g., elevation, natural features, buildings, etc.), a name associated with the first geographic area, etc.

In some aspects, the processor(s) 106 are configured to obtain meteorologic data for a second geographic area from the meteorological data provider(s) 116 and stored as the second geographic area meteorologic data 128 at the memory 108. As noted above, the meteorologic data can include data indicating wind speed, wind direction, temperature, barometric pressure, etc. for the second geographic area. In some implementations, the first geographic area indicated by the first geographic area data 126 is smaller than and entirely bounded by the second geographic area associated with the second geographic area meteorologic data 128. For example, the first geographic area data 126 can indicate a first geographic area corresponding to one city block or less, and the second geographic area associated with the second geographic area meteorologic data 128 can correspond to at least a neighborhood or city that contains the first geographic area.

In some implementations, the processor(s) 106 are configured to determine topographic parameters 114 associated with one or more geographic areas. In some aspects, the processor(s) 106 are configured to determine topographic parameters 114 associated with the first geographic area (i.e., the geographic area indicated by the first geographic area data 126). The topographic parameters 114 can include, for example, descriptions of buildings, descriptions of streets, descriptions of land usage, descriptions of land surface topology, or any combination thereof. In a particular aspect, the topographic parameters 114 can be gathered, calculated, analyzed, and/or otherwise derived from all or a portion of the first geographic area data 126, the geographic area data 132, or some combination thereof.

In some implementations, the processor(s) 106 are configured to perform a comparison of the topographic parameters 114 associated with the first geographic area to topographic parameters 114 associated with a plurality of predetermined micro-weather models 120. Each of the plurality of predetermined micro-weather models 120 can include data associated with a mathematical model of a particular weather pattern associated with a particular geographic area. In some aspects, each of the plurality of predetermined micro-weather models 120 can generate output including estimates of a plurality of local wind fields 130 within the first geographic area. In a particular aspect, the estimates of a plurality of local wind fields 130 can be stored at the memory 108. In the same or alternative aspects, each of the plurality of predetermined micro-weather models 120 can be associated with a particular set of meteorologic conditions associated with the second geographic area.

In some aspects, one or more of the plurality of predetermined micro-weather models 120 includes parameters for calculating, based on the second geographic area meteorologic data 128, estimates of a plurality of local wind fields 130 within the first geographic area. In the same or alternative aspects, one or more of the plurality of predetermined micro-weather models 120 can include a machine-learning model configured to receive input based on the second geographic area meteorologic data 128 and to generate output including estimates of a plurality of local wind fields 130 within the first geographic area. In further the same or alternative aspects, one or more of the plurality of predetermined micro-weather models 120 indicates predetermined estimates of a plurality of local wind fields 130 within a third geographic area. In such aspects, the topographic parameters 114 of the third geographic area are a closest match, based on the comparison of the topographic parameters 114 associated with the first geographic area to topographic parameters 114 associated with a plurality of predetermined micro-weather models 120, to the topographic parameters 114 of the first geographic areas.

In some aspects, at least a subset of the plurality of predetermined micro-weather models 120 are generated using a computational fluid dynamics analysis of one or more third geographic areas based on topographic parameters 114 associated with the one or more third geographic area and meteorologic data associated with one or more fourth geographic areas, where each of the one or more third geographic areas is smaller than and entirely bounded by a respective one of the one or more fourth geographic areas, and where the first geographic area is distinct from each of the one or more third geographic areas. In a particular aspect, the second geographic area is distinct from each of the one or more fourth geographic areas.

In some implementations, the processor(s) 106 are configured to select a particular micro-weather model from among the plurality of predetermined micro-weather models 120 based on the comparison of the topographic parameters 114 associated with the first geographic area to topographic parameters 114 associated with the plurality of predetermined micro-weather models 120. In some aspects, a micro-weather model selector 118 of the processor(s) 106 can be configured to select the particular micro-weather model from among the plurality of predetermined micro-weather models 120.

In some aspects, selecting the particular micro-weather model from among the plurality of predetermined micro-weather models 120 includes selecting a third geographic area that is similar to the first geographic area based on the topographic parameters 114 of the first geographic area and corresponding topographic parameters 114 of the third geographic area. For example, the micro-weather model selector 118 can select a third geographic area with substantially similar building descriptions and land surface topology to the building descriptions and land surface topology of the first geographic area. In such aspects, the processor(s) 106 can be configured to estimate, based on the selected micro-weather model and the second geographic area meteorologic data 128, local wind fields for the third geographic area. The processor(s) 106 can also be configured to perform one or more data transformation operations to map the local wind fields for the third geographic area to the first geographic area. The data transformation operations can include, for example, rotating positions of the local wind fields based on a wind direction of the second geographic area meteorologic data 128 and relative orientations of the first and third geographic areas.

In some implementations, the processor(s) 106 can be configured to determine, based on the second geographic area meteorologic data 128 and the selected micro-weather model, risk data 122 indicative of probability of particular meteorological conditions in the first geographic area. In a particular aspect, the risk data 122 can indicate probability of occurrence of local winds that exceed one or more specified thresholds. For example, a first risk level can be associated with a probability of occurrence of winds below five miles per hour, a second risk level can be associated with a probability of occurrence of winds between five and ten miles per hour, a third risk level can be associated with a probability of occurrence of winds between ten and fifteen miles per hour, etc.

In some aspects, the risk data 122 includes a plurality of risk values for the first geographic area. In such aspects, the risk data 122 can include, for example, a representative risk value for each grid section of a plurality of grid sections of the first geographic area, wherein the plurality of grid sections represent laterally offset subregions of the first geographic area. As an additional example, the risk data 122 can include a respective risk value for each layer of a plurality of layers of the first geographic area, wherein the plurality of layers represents vertically offset air volumes associated with the first geographic area.

In the same or alternative aspects, the processor(s) 106 can be configured to obtain a descriptor of an aircraft type. The descriptor can include, for example, data associated with a particular aircraft, a particular type of aircraft, etc. In such configurations, the risk data 122 can be further based on the aircraft type. For example, an aircraft type with a large airframe may be at less risk of high winds than an aircraft type with a smaller airframe.

In some implementations, the processor(s) 106 can be configured to generate a graphic user interface 124 representing at least the first geographic area and visually distinguishing, via the graphical user interface 124, a first portion of the first geographic area that is indicated in the risk data 122 to be associated with a first risk level from a second portion of the first geographic area that is indicated in the risk data 122 to be associated with a second risk level.

FIG. 1 provides an example illustration 136 of the operation of the systems and methods disclosed herein. In operation, the system 100 receives data indicating a first geographic area (e.g., the first geographic area data 126). The system 100 also obtains meteorologic data for a second geographic area (e.g., the second geographic area meteorologic data 128), wherein the first geographic area is smaller than and entirely bounded by the second geographic area. The data indicating the first geographic area can identify a first geographic area 140. The first geographic area 140 is smaller than and entirely bounded by a second geographic area 138. The second geographic area 138 can have meteorologic data associated therewith, indicating, for example, wind conditions, temperature, barometric pressure, etc.

In the example illustration 136, the system 100 can determine topographic parameters 114 associated with the first geographic area 140. For example, the system 100 can determine descriptions of buildings within the first geographic area 140. The system 100 can also perform a comparison of the topographic parameters 114 associated with the first geographic area 140 to topographic parameters 114 associated with a plurality of predetermined micro-weather models 120. For example, the system 100 can compare the descriptions of buildings within the first geographic area 140 to descriptions of buildings within the geographic areas associated with each of the plurality of micro-weather models 120.

In the example illustration 136, the system 100 can select a micro-weather model 142 from among the plurality of predetermined micro-weather models 120 based on the comparison of the topographic parameters 114 associated with the first geographic area 140 to topographic parameters 114 associated with a plurality of predetermined micro-weather models 120. The selected micro-weather model 142 has associated therewith particular topographic parameters 114 (e.g., descriptions of the buildings illustrated within the selected micro-weather model 142), as well as output that indicates estimates of a plurality of local wind fields 130 within the first geographic area 140. In the example illustration 136, the estimates of local wind fields within the first geographic area 140 are illustrated by the various arrows within the selected micro-weather model 142.

In the example illustration 136, the system 100 can also determine, based on the meteorologic data for the second geographic area 138 (e.g., the second geographic area meteorologic data 128), risk data 122 indicative of risk of particular meteorological conditions in the first geographic area 140. For example, each of the plurality of micro-weather models 120 can have an associated mathematical model that must be solved for a particular set of mesoscale meteorologic conditions associated with the second geographic area 138. Based on the particular set of mesoscale meteorologic conditions, the selected micro-weather model 142 can estimate a plurality of local wind fields within the first geographic area. The system 100 can then associate risk data 122 with various portions of the first geographic area 140 based on the estimates of the plurality of local wind fields. In the example illustration 136, the risk data 122 includes a respective risk value for each grid section of a plurality of grid sections 144 of the first geographic area 140, wherein the plurality of grid sections represent laterally offset subregions of the first geographic area 140. The risk values associated with the plurality of grid sections 144 can, for example, be illustrated with a graphic user interface 124 as differently shaded sections, with different shades associated with different risk levels.

The illustration 136 is provided to aid in understanding and is not intended to limit the scope of the subject disclosure. For example, the second geographic area 138 is illustrated as a square grid. However, the data indicating the second geographic area 138 could describe the second geographic area 138 in any other appropriate manner without departing from the scope of the subject disclosure.

The system 100 can also include components not illustrated in FIG. 1. For example, to receive some or all of the geographic area data 132 and/or the meteorologic area data 134, the system 100 can also include one or more input/output interfaces, one or more network interfaces, etc. Further, although FIG. 1 illustrates the memory 108 of the system 100 as storing certain data described below, more, fewer, and/or different data can be present within the memory 108 without departing from the scope of the subject disclosure.

Additionally, although FIG. 1 illustrates certain operations occurring within the computing device 102, these operations can be performed by other components of the system 100 without departing from the scope of the subject disclosure. For example, one or more of the meteorologic data providers 116 can be configured to host or otherwise incorporate one or more of the predetermined micro-weather models 120.

Further, although FIG. 1 illustrates the computing device 102, the geographic area data provider(s) 104, and/or the meteorologic data provider(s) 116 as separate, other configurations are possible without departing from the scope of the subject disclosure. For example, the computing device 102 and the meteorologic data provider(s) 116 can be integrated into the same electronic device. As an additional example, some or all components of the computing device 102 can be integrated into the same electronic device as some or all components of the geographic area data provider(s) 104 and/or the meteorologic data provider(s) 116. As a further example, one or more components of the computing device 102 and/or one or more components of the geographic area data provider(s) 104 and/or one or more components of the meteorologic data provider(s) 116 can be distributed across a plurality of computing devices (e.g., a group of servers). As a still further example, one or more components of the geographic area data provider(s) 104 can be combined with one or more components of the meteorologic data provider(s) 116 into one or more computing devices.

Figure 2:
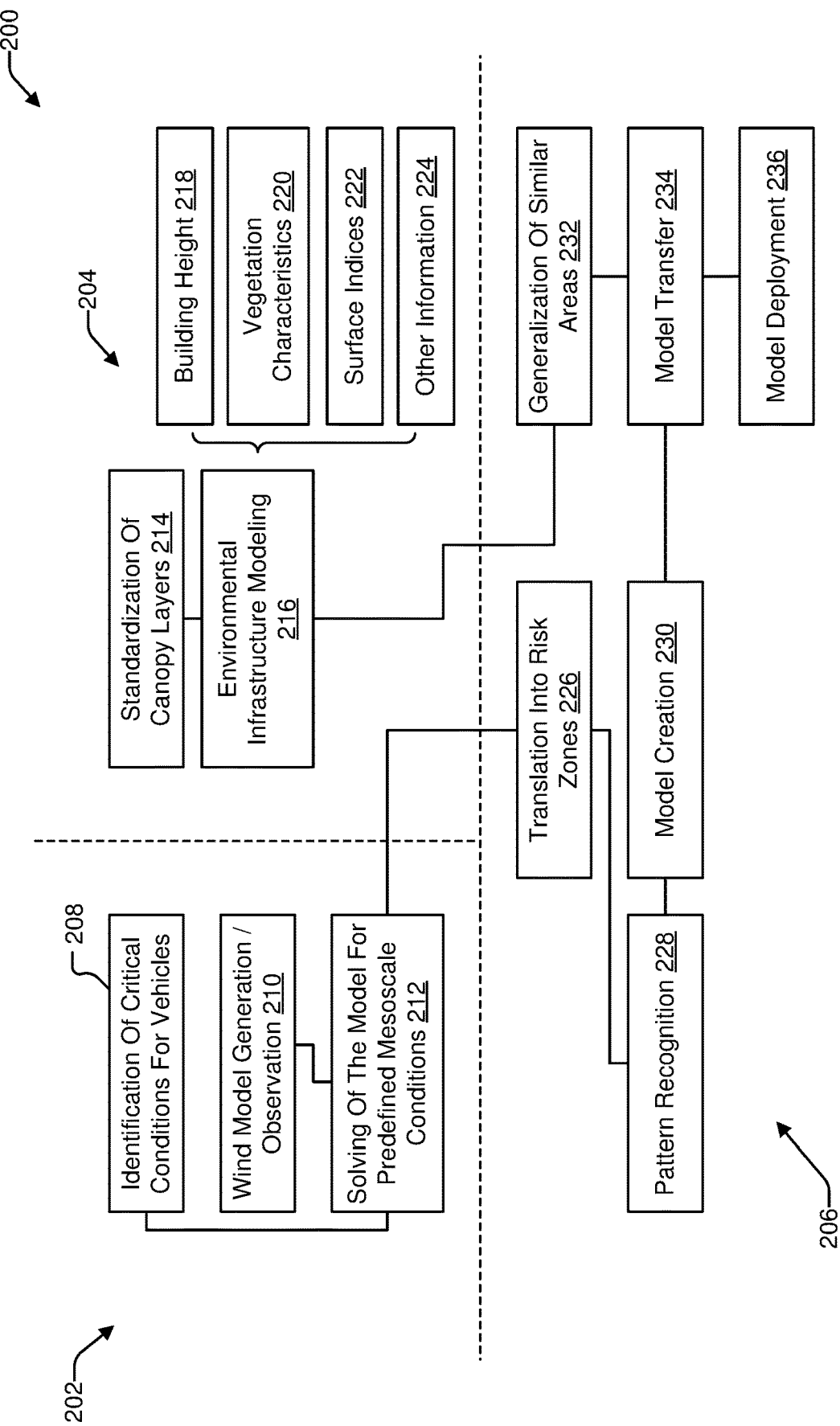
FIG. 2 depicts an example architecture illustrating a particular implementation of an automated environment for micro-weather risk mapping for very low-level aerial vehicles, in accordance with at least one implementation of the subject disclosure.

FIG. 2 depicts an example task diagram 200 illustrating a particular implementation of an automated environment for micro-weather risk mapping for very low-level aerial vehicles, in accordance with at least one implementation of the subject disclosure. Each of the components of the task diagram 200 can be performed by, for example, the processor(s) 106 of FIG. 1. The example task diagram 200 includes a micro-weather data creation region 202, a canopy layer modeling region 204, and a pattern recognition region 206.

In some implementations, the task diagram 200 includes the micro-weather data creation region 202. The operations described in the micro-weather data creation region 202 illustrate an exemplary structure for generating the predetermined micro-weather models of FIG. 1. In some aspects, the micro-weather data creation region 202 includes, at block 208, identification of critical conditions for vehicles. This can include, for example, identifying a particular type of vehicle, a particular class of vehicles, etc., as well as the types of meteorologic conditions for which the identified vehicles may need to be especially aware for the purposes of flight planning. For example, a particular class of unmanned aerial vehicle may be particularly susceptible to strong winds, winds from a particular direction with respect to the vehicle's flight path, a particular rotational wind effect, etc.

In some aspects, the micro-weather data creation region 202 also includes, at block 210, wind model generation and observation. This can include, for example, collecting real-world meteorologic data associated with one or more geographic areas. The collected data can be used to establish or refine parameters associated with one or more of the predetermined micro-weather models 120 of FIG. 1. As another example, the wind model generation can include creation of a number of surrogate computational fluid dynamics simulations in lieu of, or in addition to, collecting real-world meteorologic data. In some aspects, the wind model generation and observation can also receive as input data from the canopy layer modeling region 204, as described in more detail below. This data can include, for example, topographic parameters such as building height, vegetation, etc. used to create an environmental infrastructure model.

In some aspects, the micro-weather data creation region 202 also includes, at block 212, solving of the model for predefined mesoscale conditions. As described in more detail above with reference to FIG. 1, micro-weather risk mapping for very low-level aerial vehicles can include solving a selected one of the plurality of predetermined micro-weather models 120 for a particular set of mesoscale meteorological conditions. In a particular aspect, a particular micro-weather model can be solved for a predetermined set of mesoscale meteorological conditions. By associating a particular micro-weather model with a predetermined set of mesoscale meteorological conditions, some of all of the predetermined micro-weather models 120 can be precomputed for use in micro-weather risk mapping.

In some implementations, the task diagram 200 can include the canopy layer modeling region 204. The operations described in the canopy layer modeling region 204 illustrate an exemplary structure for enabling the comparison of the topographic parameters 114 associated with the first geographic area to the topographic parameters 114 associated with a plurality of predetermined micro-weather models 120 of FIG. 1. In some aspects, the canopy layer modeling region 204 includes one or more operations for categorization of model components by key indicators that impact the atmospheric conditions on a hyperlocal scale. For example, the canopy layer modeling region 204 can include, at block 214, standardization of canopy layers. This can include, for example, setting standard elevations at which canopy layers are set across the plurality of predetermined micro-weather models 120 of FIG. 1.

The canopy layer modeling region 204 can also include, at block 216, environmental infrastructure modeling. Environmental infrastructure modeling can include identifying a plurality of key factors across which the topographical features of various models should be categorized. Those key factors can include, for example building height 218, vegetation characteristics 220, surface indices 222, and other information 224. By establishing a standardized category of features for the micro-weather models and the geographic areas under consideration, automated comparison of topographic features (e.g., the topographic parameters 114 of FIG. 1) across areas and models can be facilitated. Although three key features (e.g., the building height 218, the vegetation characteristics 220, and the surface indices 222) are illustrated in the example task diagram 200, more, fewer, and/or different key features can be used without departing from the scope of the subject disclosure.

In some implementations, the task diagram 200 can include the pattern recognition region 206. In some aspects, the pattern recognition region 206 includes, at block 226, translation of the solved model (e.g., the output from block 212) into risk zones. As described in more detail above with reference to FIG. 1, the processor(s) 106 can be configured to determine, based on the meteorologic data for the second geographic area and the micro-weather model, risk data (e.g., the risk data 122) indicative of risk of particular meteorological conditions in the first geographic area.

In some aspects, the pattern recognition region 206 can also include, at block 228, pattern recognition. Pattern recognition can include, for example, identifying a best match in an existing data set for a different micro-weather area, as described in more detail below with reference to FIG. 5. In a particular aspect, the recognized pattern can be used to create one or more micro-weather models for a different geographic area. For example, by comparing the topographic parameters associated with the first geographic area to topographic parameters associated with a plurality of predetermined micro-weather models, and selecting a micro-weather model from among the plurality of predetermined micro-weather models based on the comparison, the selected micro-weather model can be transferred to a new data set with different, but substantially similar, topographic features.

In some aspects, the pattern recognition region 206 can also include, at block 230, model creation. Model creation can include, for example, creating a new micro-weather model based on the results of the application of the pattern recognition algorithm. In some aspects, the transfer of a model to a new data set (e.g., at block 234) can also include, at block 232, generalization of similar areas. For example, the pattern recognition algorithm can identify a plurality of geographic areas with substantially the same topographic features. By generalizing the predicted micro-weather associated with each of the plurality of geographic areas, a model that is more readily adapted to a similar area can be created. Once a particular model is ready for use (e.g., as described in more detail above with reference to FIG. 1), the model can, at block 236, be deployed.

Although FIG. 2 illustrates certain operations occurring within various portions of the task diagram 200, these operations can be performed by other components and/or at different points of the task diagram 200 without departing from the scope of the subject disclosure. For example, the operations of the micro-weather data creation region 202 can be performed by the processor(s) 106 of FIG. 1, while the operations of the canopy layer modeling region 204 can be performed by the processor(s) 106 and/or another electronic device. As another example, although three key features (e.g., the building height 218, the vegetation characteristics 220, and the surface indices 222) are illustrated in the example task diagram 200, more, fewer, and/or different key features can be used without departing from the scope of the subject disclosure.

Figure 3:
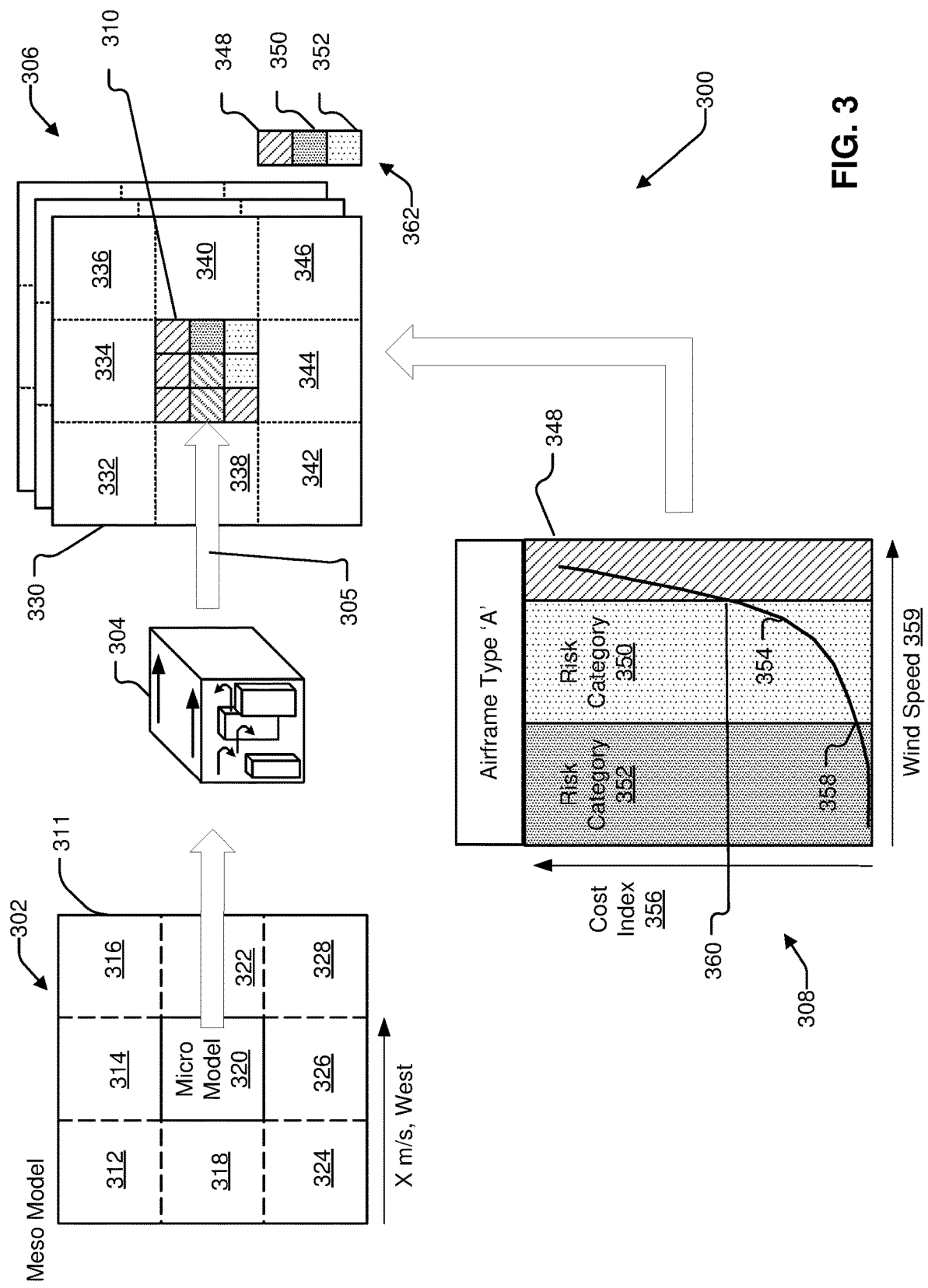
FIG. 3 is an example of a categorization of a micro-weather simulation, in accordance with at least one implementation of the subject disclosure.

FIG. 3 is an example of a categorization 300 of a micro-weather simulation, in accordance with at least one implementation of the subject disclosure. In the example of FIG. 3, data associated with a mesoscale model 302 of a geographic area is used to solve a micro-weather model 304 of a particular subregion of the geographic area. Data associated with a risk value categorization 308 can be used to translate the output of the micro-weather model 304 into a plurality of risk factors associated with the particular subregion. In some implementations, the categorization 300 can be performed by one or more components of the processor(s) 106 of FIG. 1.

In some implementations, the mesoscale model 302 of a particular geographic area 311 has associated therewith certain meteorological conditions. For example, the mesoscale model 302 can have windspeed values and wind direction values (e.g., "X m/s, West") associated the particular geographic area 311. The geographic area 311 is illustrated in FIG. 3 as a plurality of grid sections representing laterally offset subregions 312, 314, 316, 318, 320, 322, 324, 326, 328 of the geographic area 311. Each subregion that is entirely bounded by the geographic area 311 can have an associated plurality of predetermined micro-weather models (e.g., the plurality of micro-weather models 120 of FIG. 1). In the illustration of FIG. 3, the subregion 320 is entirely bounded by the geographic area 311 and has an associated micro-weather model 304.

The micro-weather model 304 has associated therewith particular topographic parameters (e.g., descriptions of the buildings illustrated within the micro-weather model 304), as well as output 305 that indicates estimates of a plurality of local wind fields within the subregion 320. In the example categorization 300, the estimates of local wind fields within the subregion 320 are illustrated by the various arrows within the micro-weather model 304.

In addition to the micro-weather model 304, the categorization 300 can also make use of the risk value categorization 308 to translate the output 305 of the micro-weather model 304 into a plurality of risk factors associated with the particular subregion. The risk value categorization 308 illustrates a graph with an x-axis 359 indicating wind speed and a y-axis 356 indicating a cost index. The cost index indicated by the y-axis 356 can include, for example, an operational cost associated with operating an unmanned aerial vehicle within a particular subregion (e.g., the subregion 320) of the geographic area 311. The risk value categorization 308 includes an exemplary line 354 that shows how the cost index rises as a function of wind speed. In a particular aspect, for a particular type of aircraft (e.g., "Airframe Type 'A'," as illustrated in FIG. 3), the risk value categorization 308 can have assigned a plurality of risk categories 348, 350, 352 based on predetermined cost thresholds. The risk category 352 can illustrate, for example, a first level of risk associated with operating a vehicle with airframe type A below a first threshold point 358 associated with a first particular wind speed and a first particular cost index value. The risk category 350 can illustrate, for example, a second level of risk associated with operating the vehicle with airframe type A above the first threshold point 358 and below a second threshold point 360 associated with a second particular wind speed and a second particular cost index value. The risk category 348 can illustrate, for example, a third level of risk associated with operating the vehicle with airframe type A above the second threshold point 360.

By incorporating data associated with the vehicle type (e.g., the "Airframe Type 'A'"), the risk value categorization 308 can adapt the risk categories 348, 350, 352 depending on a cost associated with operating that particular vehicle type in a particular set of meteorological conditions. For example, if airframe type A is lighter than airframe type B, it may be more expensive to attempt to operate the airframe type A in higher wind speeds, but less expensive to attempt to operate the airframe type A in lower wind speeds. Thus, the line 354 illustrating how the cost index changes as a function of wind speed can differ from the airframe type A to the airframe type B. Accordingly, the threshold points 360, 358 can be at different points on the risk value categorization 308 depending on the airframe type.

In the example of FIG. 3, the risk categories 348, 350, 352 are each associated with a different shading. The three exemplary risk categories 348, 350, 352 and the associated shading is illustrated by a risk category key 362 associated with a graphical representation 306. The shading associated with the risk categories 348, 350, 352 are mapped to each grid section of a plurality of grid sections 310 of the subregion 320, where the plurality of grid sections 310 represents laterally offset subregions of the subregion 320. In other configurations, the risk categories 348, 350, 352 can be mapped to each layer of a plurality of layers of the subregion 320, where the plurality of layers represents vertically offset air volumes associated with the subregion 320.

In some aspects, the graphical representation 306 includes the plurality of grid sections 310 in the context of the particular geographic area associated with the mesoscale model 302 described above. The particular geographic area associated with the mesoscale model 302 can be represented graphically by a plurality of geographic regions 330 (e.g., a square grid including the subregions 332, 334, 336, 338, 340, 342, 344, 346). As illustrated, a first portion of the plurality of grid sections 310 (e.g., the portion associated with the first risk category 352) is depicted in a manner that is visually distinguishable from a second portion of the plurality of grid sections 310 (e.g., the portion associated with the second risk category 350).

Although FIG. 3 illustrates the categorization 300 as including particular components, more, fewer, and/or different components can be present within the exemplary categorization 300 without departing from the scope of the subject disclosure. For example, the geographic area 311 can include more, fewer, and/or different subregions, can be indicated, depicted, and/or analyzed in a manner other than as a grid, or some combination thereof. As an additional example, the risk value categorization 308 can include more, fewer, and/or different risk categories than the risk categories 348, 350, 352.

Figure 4:
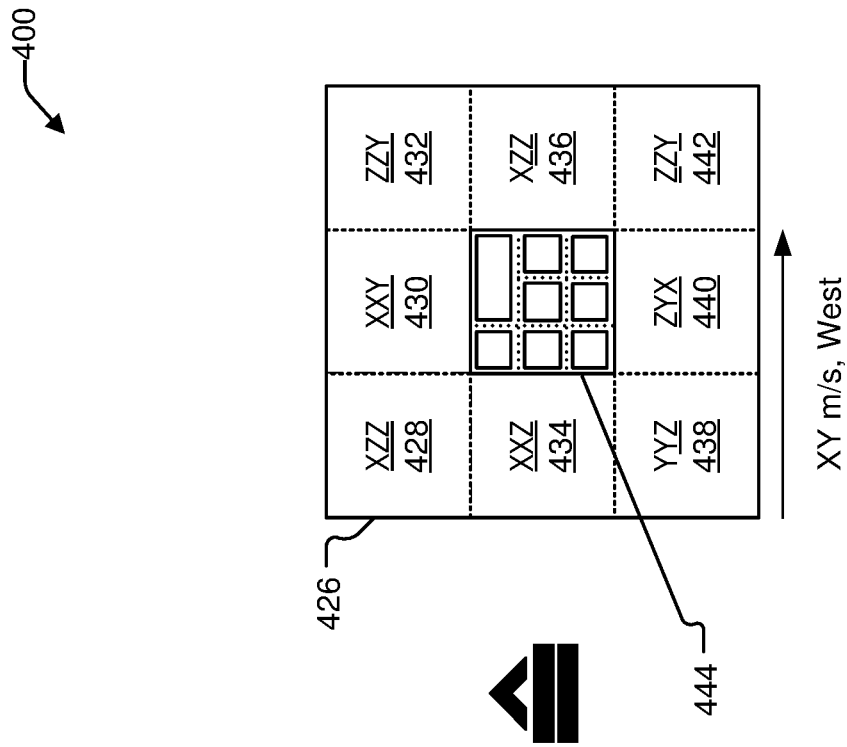
FIG. 4 is an exemplary illustration of a set of predetermined micro-weather simulations for divergent areas with characteristic properties estimating a micro-weather pattern for a different micro-weather area, in accordance with at least one implementation of the subject disclosure.
Figure 4:
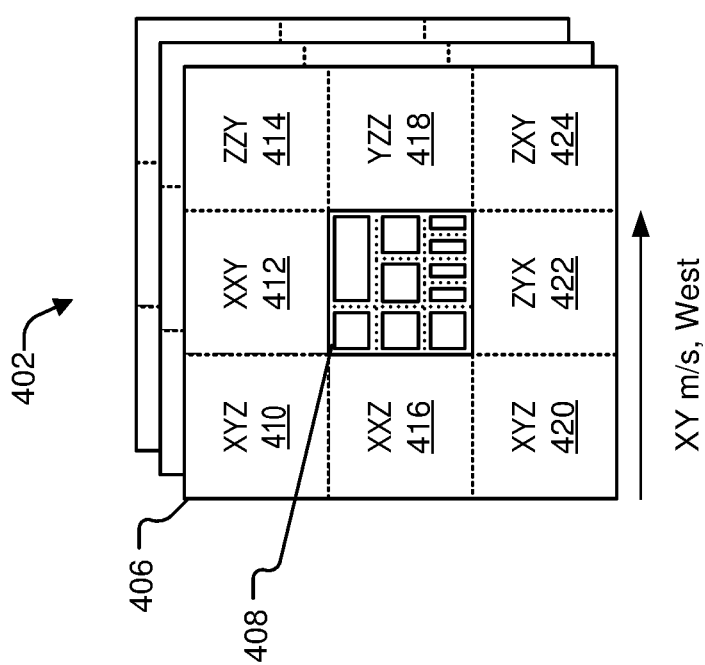

FIG. 4 is an exemplary illustration 400 of a set 402 of predetermined micro-weather simulations 406 for subregions 408, 410, 412, 414, 416, 418, 420, 422, 424 with characteristic properties estimating a micro-weather pattern for a different micro-weather area 426, in accordance with at least one implementation of the subject disclosure.

Each of the predetermined micro-weather simulations 406 of the set 402 is associated with a particular geographic area, as described in more detail above with reference to FIGS. 1-3. In the illustration of FIG. 4, the micro-weather simulation 406 is associated with a particular geographic area that can be subdivided into a plurality of subregions 408, 410, 412, 414, 416, 418, 420, 422, 424. Each of those subregions is associated with one or more topographic parameters or properties (e.g., the topographic parameters 114 of FIG. 1). For example, the topographic parameter of interest for a particular micro-weather simulation 406 can include a description of land surface topology. In the illustration 400, each of the plurality of subregions 408, 410, 412, 414, 416, 418, 420, 422, 424 have an associated topographic parameter denoted by a combination of the letters X, Y, and Z. For example, the subregion 410 has a particular land surface topology described by the letters "XYZ."

Additionally, the subregion 408 has a particular set of topographic parameters that can include a particular layout of buildings, illustrated by the different rectangles within the subregion 408 in the illustration 400. In some implementations, a pattern recognition algorithm can identify a best match among the set 402 of predetermined micro-weather simulations 406 for a new, different micro-weather area 444 of a larger geographic area 426. As with each of the predetermined micro-weather simulations 406, the geographic area 426 can be subdivided into a plurality of subregions 428, 430, 432, 434, 436, 438, 440, 442, 444.

As described in more detail above with reference to FIG. 2, each of the plurality of predetermined micro-weather simulations 406 and the data associated with the new geographic area 426 can be standardized according to one or more topographic parameters of interest. For example, as each of the subregions of the predetermined micro-weather simulation 406 can have an associated topographic parameter describing the land surface topology of each of the subregions, so too will each of the subregions 428, 430, 432, 434, 436, 438, 440, 442, 444 have an associated topographic parameter describing the land surface topology of each of the subregions 428, 430, 432, 434, 436, 438, 440, 442, 444 (e.g., as denoted by a combination of the letters X, Y, and Z in the illustration 400). For example, the subregion 428 has a particular land surface topology described by the letters "XZZ."

In some aspects, the pattern matching algorithm can identify a best match among the set 402 of predetermined micro-weather simulations 406 for the new, different micro-weather area 444 of the larger geographic area 426 by comparing the topographic parameters associated with each of the subregions 408, 410, 412, 414, 416, 418, 420, 422, 424 of the micro-weather simulation 406 with the topographic parameters associated with each of the subregions 428, 430, 432, 434, 436, 438, 440, 442, 444 of the geographic area 426. For example, the pattern matching algorithm can compare the topographic parameter "XYZ" of the subregion 410 with the topographic parameter "XZZ" of the subregion 428. In the illustration 400, the greater the number of letters in common between the topographic parameters of a plurality of subregions, the more similar the topographic parameter will be. For example, the topographic parameter "XYZ" of the subregion 410 and the topographic parameter "XZZ" of the subregion 428 only differ by one letter, indicating an approximately 67% similarity between the two topographic parameters. In the illustration 400, each pair of compared subregions between the predetermined micro-weather simulation 406 and the geographic area 426 shows at least an approximately 67% similarity. Some pairs (e.g., the subregion 422 and the subregion 440) show an approximately 100% similarity.

With such a high degree of similarity between the topographic parameter(s) of the predetermined micro-weather simulation 406 and the topographic parameter(s) of the geographic area 426, the predetermined micro-weather simulation 406 can be used to estimate micro-weather behavior at the geographic area 426. For example, the subregion 408 of the predetermined micro-weather simulation 406 has a different arrangement of buildings (illustrated by the rectangles within the subregion 408) than the subregion 444 of the geographic area 426 (illustrated by the rectangles within the subregion 444). However, if the arrangement is sufficiently similar and the topographic parameters of the respective surrounding subregions are also sufficiently similar for a particular set of mesoscale meteorological conditions, the outputs of the predetermined micro-weather simulation 406 can be used to predict meteorological conditions associated with the subregion 444 of the geographic area 426. For example, as described in more detail above with reference to FIG. 1, the outputs of a micro-weather simulation can include estimates of a plurality of local wind fields. Those estimates, associated with the subregion 408, can be used to predict a plurality of local wind fields associated with the subregion 444. Since the set 402 of predetermined micro-weather simulations 406 are predetermined and the pattern recognition algorithm is less intensive with regard to computing resources than a full mathematical simulation based on meteorologic data, an estimate of micro-weather meteorological conditions at a subregion can be provided (e.g., by the processor(s) 106 of FIG. 1) faster and with fewer computing resources.

In the illustration 400, the letters X, Y, and Z are used to illustrate various potential values for a particular topographic parameter. The letters X, Y, and Z are provided as illustrative only to aid in understanding. The particular use of these letters should not be understood to limit the scope of the subject disclosure. For example, in a particular configuration of the system 100 of FIG. 1, the topographic parameter associated with each of the subregions 408, 410, 412, 414, 416, 418, 420, 422, 424, 428, 430, 432, 434, 436, 438, 440, 442, 444 can be numerical data values. In such a configuration, the similarity between two topographic parameters can be established by comparing two numerical data values with reference to a predetermined difference threshold (e.g., 5%). In the same or alternative configurations, the topographic parameters can include a plurality of numerical data values describing one or more particular topographic parameters. In such configurations, the similarity between any two topographic parameters can be established by comparing two numerical data values with reference to a predetermined difference threshold (e.g., 5%), comparing the respective similarities of sets of numerical data values with respect to a predetermined similarity threshold (e.g., at least ⅔ of the sets of numerical data values must be within 5% of one another), or some combination thereof.

Figure 5:
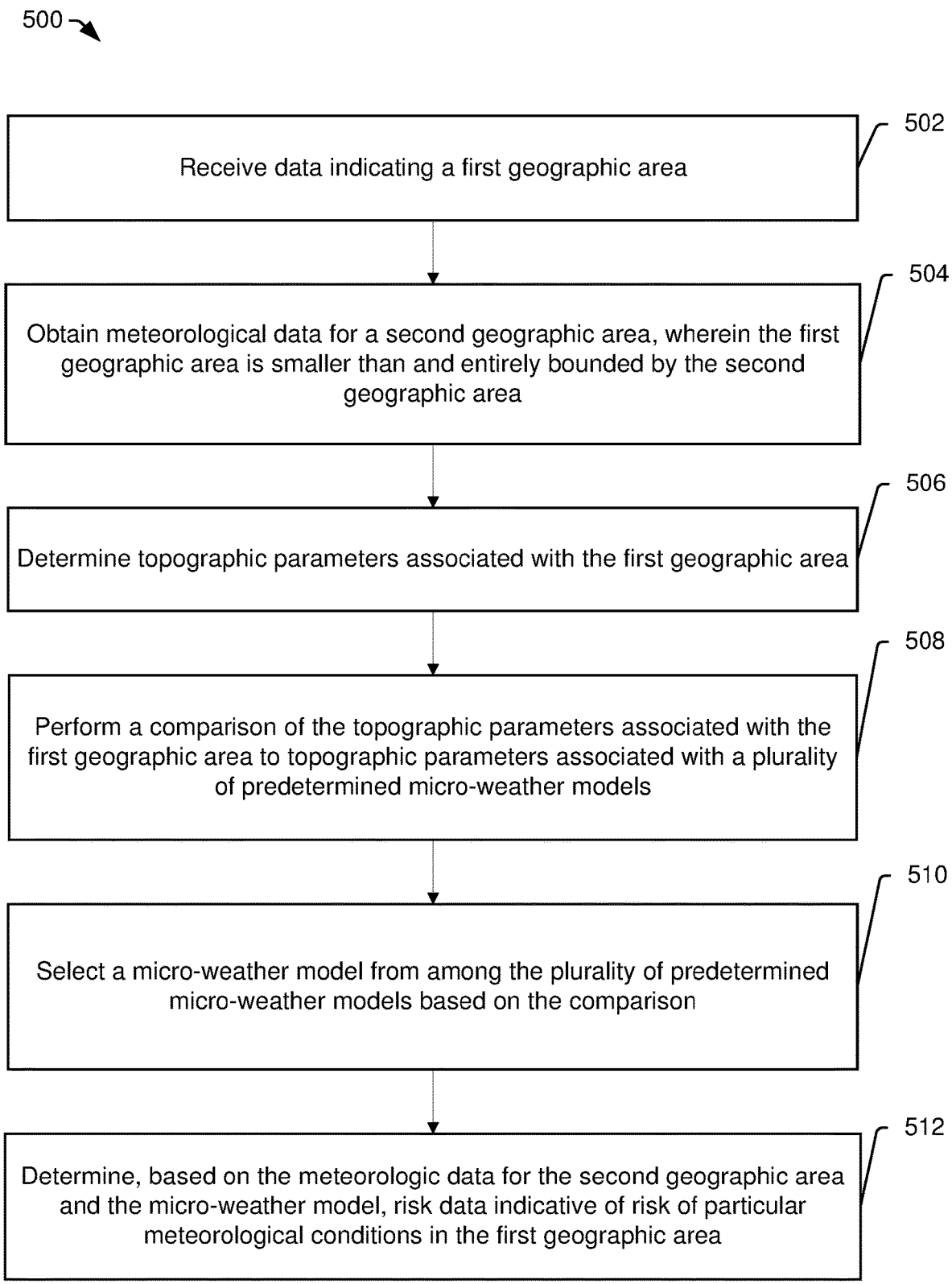
FIG. 5 is a flow chart of an example method for providing micro-weather risk mapping for very low-level aerial vehicles, in accordance with at least one implementation of the subject disclosure.

FIG. 5 is a flow chart of an example method 500 for providing micro-weather risk mapping for very low-level aerial vehicles, in accordance with at least one implementation of the subject disclosure. The method 500 can be initiated, performed, or controlled by one or more processors executing instructions, such as by the processor(s) 106 of FIG. 1 executing instructions from the memory 108.

In some implementations, the method 500 optionally includes, at block 502, receiving data indicating a first geographic area. For example, the processor(s) 106 of FIG. 1 can receive the first geographic area data 126 from the geographic area data provider(s) 104.

In some implementations, the method 500 optionally includes, at block 504, obtaining meteorological data for a second geographic area, wherein the first geographic area is smaller than and entirely bounded by the second geographic area. For example, the processor(s) 106 of FIG. 1 can obtain the second geographic area meteorologic data 128 from the meteorologic data provider(s) 116.

In some implementations, the method 500 optionally includes, at block 506, determining topographic parameters associated with the first geographic area. For example, the processor(s) 106 of FIG. 1 can determine the topographic parameters 114 associated with the first geographic area indicated by the first geographic area data 126.

In some implementations, the method 500 optionally includes, at block 508, performing a comparison of the topographic parameters associated with the first geographic area to topographic parameters associated with a plurality of predetermined micro-weather models. For example, the processor(s) 106 of FIG. 1 can compare the topographic parameters 114 associated with the first geographic area indicated by the first geographic area data 126 to the topographic parameters 114 associated with a plurality of predetermined micro-weather models 120.

In some implementations, the method 500 optionally includes, at block 510, selecting a micro-weather model from among the plurality of predetermined micro-weather models based on the comparison. For example, the micro-weather model selector 118 of FIG. 1 can select a micro-weather model from among the plurality of predetermined micro-weather models 120 based on the comparison of the topographic parameters 114 associated with the first geographic area indicated by the first geographic area data 126 to the topographic parameters 114 associated with a plurality of predetermined micro-weather models 120.

In some implementations, the method 500 optionally includes, at block 512, determining, based on the meteorologic data for the second geographic area and the micro-weather model, risk data indicative of risk of particular meteorological conditions in the first geographic area. For example, the processor(s) 106 of FIG. 1 can determine, based on the second geographic area meteorologic data 128 and the micro-weather model selected from among the plurality of micro-weather models 120, the risk data 122 indicative of risk of particular meteorological conditions in the first geographic area indicated by the first geographic area data 126.

Although the method 500 is illustrated as including a certain number of steps, more, fewer, and/or different steps can be included in the method 500 without departing from the scope of the subject disclosure. For example, the method 500 can vary depending on the count and variety of data requirements available for processing, as described in more detail above with reference to FIGS. 1-4. For example, the method 500 can also include generating a graphic user interface (e.g., the graphical user interface 124 of FIG. 1) representing at least the first geographic area and visually distinguishing, in the graphical user interface, a first portion of the first geographic area that is indicated in the risk data to be associated with a first risk level from a second portion of the first geographic area that is indicated in the risk data to be associated with a second risk level.

Figure 6:
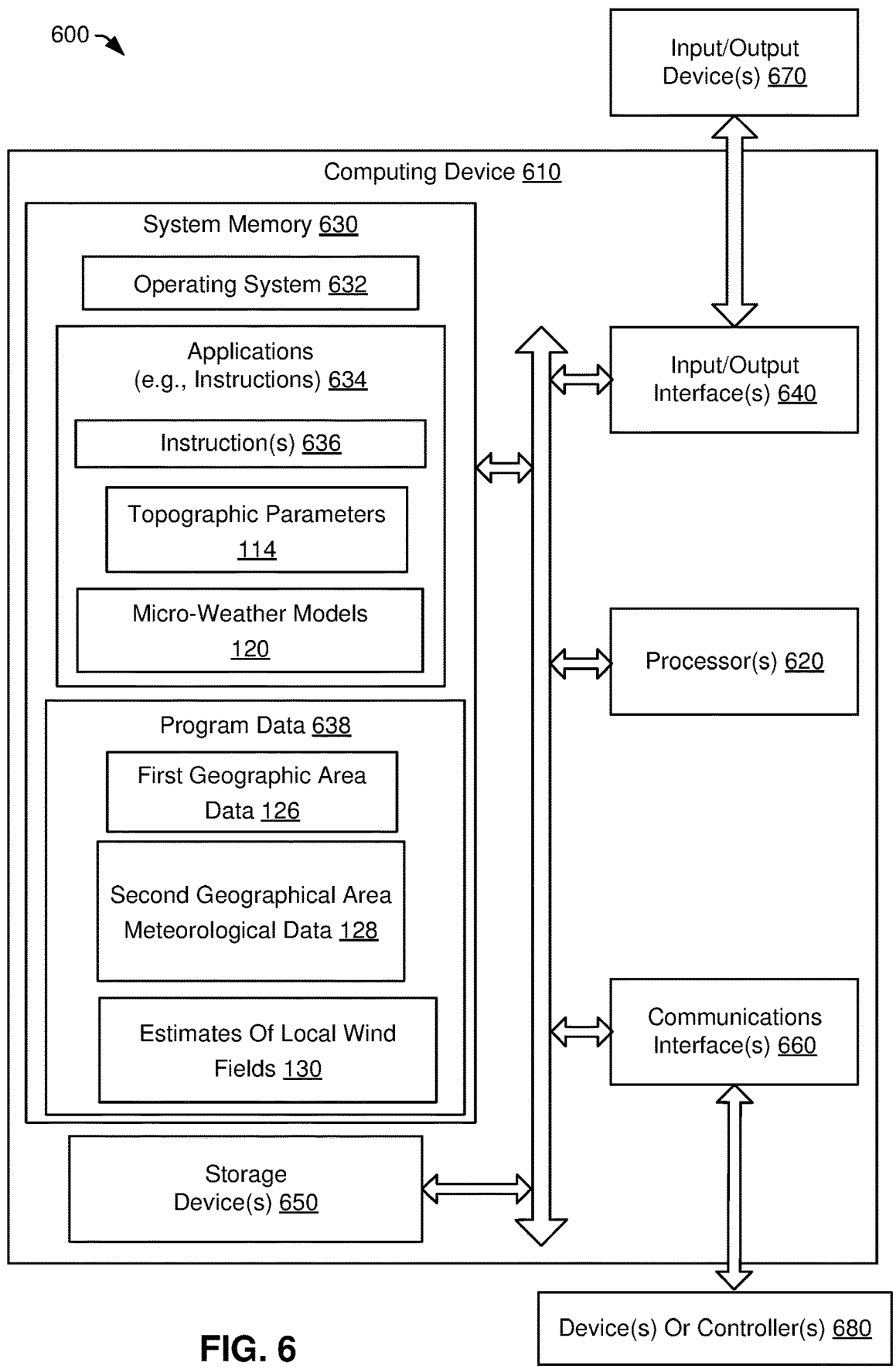
FIG. 6 is a block diagram of a computing environment including a computing device configured to support aspects of computer-implemented methods and computer-executable program instructions (or code), in accordance with at least one implementation of the subject disclosure.

FIG. 6 is a block diagram of a computing environment 600 including a computing device 610 configured to support aspects of computer-implemented methods and computer-executable program instructions (or code), in accordance with at least one implementation of the subject disclosure. For example, the computing device 610, or portions thereof, is configured to execute instructions to initiate, perform, or control one or more operations described in more detail above with reference to FIGS. 1-5. In a particular aspect, the computing device 610 can include the computing device 102, the geographic area data provider(s) 104, and/or the meteorologic data provider(s) 116 of FIG. 1; one or more servers; one or more virtual devices; or a combination thereof.

The computing device 610 includes one or more processors 620. In a particular aspect, the processor(s) 620 correspond to the processor(s) 106 of FIG. 1. The processor(s) 620 are configured to communicate with system memory 630, one or more storage devices 650, one or more input/output interfaces 640, one or more communications interfaces 660, or any combination thereof. The system memory 630 includes volatile memory devices (e.g., random access memory (RAM) devices), nonvolatile memory devices (e.g., read-only memory (ROM) devices, programmable read-only memory, and flash memory), or both. The system memory 630 stores an operating system 632, which can include a basic input/output system for booting the computing device 610 as well as a full operating system to enable the computing device 610 to interact with users, other programs, and other devices. The system memory 630 stores system (program) data 638, such as the instructions 636, the topographic parameters 114, the plurality of micro-weather models 120 of FIG. 1, or a combination thereof.

The system memory 630 includes one or more applications 634 (e.g., sets of instructions) executable by the processor(s) 620. As an example, the one or more applications 634 include the instructions 636 executable by the processor(s) 620 to initiate, control, or perform one or more operations described with reference to FIGS. 1-5. To illustrate, the one or more applications 634 include the instructions 636 executable by the processor(s) 620 to initiate, control, or perform one or more operations described with reference to receiving first geographic area data 126, obtaining the second geographic area meteorologic data 128, determining the topographic parameters 114 associated with the first geographic area, performing the comparison of the topographic parameters 114 associated with the first geographic areas to the topographic parameters 114 associated with the plurality of predetermined micro-weather models 120, selecting the micro-weather model from among the plurality of predetermined micro-weather models 120 based on the comparison, determining, based on the second geographic area meteorologic data 128 and the selected micro-weather model, the risk data 122 indicative of risk of particular meteorological conditions in the first geographic area, or a combination thereof.

In a particular implementation, the system memory 630 includes a non-transitory, computer readable medium (e.g., a computer-readable storage device) storing the instructions 636 that, when executed by the processor(s) 620, cause the processor(s) 620 to initiate, perform, or control operations for providing micro-weather risk mapping for very low-level aerial vehicles. The operations include receiving data indicating a first geographic area. The operations also include obtaining meteorologic data for a second geographic area, wherein the first geographic area is smaller than and entirely bounded by the second geographic area. The operations also include determining topographic parameters associated with the first geographic area. The operations also include performing a comparison of the topographic parameters associated with the first geographic area to topographic parameters associated with a plurality of predetermined micro-weather models. The operations also include selecting a micro-weather model from among the plurality of predetermined micro-weather models based on the comparison. The operations also include determining, based on the meteorologic data for the second geographic area and the micro-weather model, risk data indicative of risk of particular meteorological conditions in the first geographic area.

The one or more storage devices 650 include nonvolatile storage devices, such as magnetic disks, optical disks, or flash memory devices. In a particular example, the storage devices 650 include both removable and non-removable memory devices. The storage devices 650 are configured to store an operating system, images of operating systems, applications (e.g., one or more of the applications 634), and program data (e.g., the program data 638). In a particular aspect, the system memory 630, the storage devices 650, or both, include tangible computer-readable media. In a particular aspect, one or more of the storage devices 650 are external to the computing device 610.

The one or more input/output interfaces 640 enable the computing device 610 to communicate with one or more input/output devices 670 to facilitate user interaction. For example, the one or more input/output interfaces 640 can include a display interface, an input interface, or both. For example, the input/output interface 640 is adapted to receive input from a user, to receive input from another computing device, or a combination thereof. In some implementations, the input/output interface 640 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device(s) 670 include one or more user interface devices and displays, including some combination of buttons, keyboards, pointing devices, displays, speakers, microphones, touch screens, and other devices.

The processor(s) 620 are configured to communicate with devices or controllers 680 via the one or more communications interfaces 660. For example, the one or more communications interfaces 660 can include a network interface. The devices or controllers 680 can include, for example, the geographic area data provider(s) 104 and/or the meteorologic data provider(s) 116 of FIG. 1.

In some implementations, a non-transitory, computer readable medium (e.g., a computer-readable storage device) stores instructions that, when executed by one or more processors, cause the one or more processors to initiate, perform, or control operations to perform part of or all the functionality described above. For example, the instructions can be executable to implement one or more of the operations or methods of FIGS. 1-5. In some implementations, part or all of one or more of the operations or methods of FIGS. 1-5 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following clauses:

According to Clause 1, a method includes receiving data indicating a first geographic area. The method also includes obtaining meteorologic data for a second geographic area, wherein the first geographic area is smaller than and entirely bounded by the second geographic area. The method also includes determining topographic parameters associated with the first geographic area. The method also includes performing a comparison of the topographic parameters associated with the first geographic area to topographic parameters associated with a plurality of predetermined micro-weather models. The method also includes selecting a micro-weather model from among the plurality of predetermined micro-weather models based on the comparison. The method also includes determining, based on the meteorologic data for the second geographic area and the micro-weather model, risk data indicative of risk of particular meteorological conditions in the first geographic area.

Clause 2 includes the method of Clause 1, the method further including generating a graphical user interface representing at least the first geographic area and visually distinguishing, in the graphical user interface, a first portion of the first geographic area that is indicated in the risk data to be associated with a first risk level from a second portion of the first geographic area that is indicated in the risk data to be associated with a second risk level.

Clause 3 includes the method of Clause 1 or Clause 2, the method further including obtaining a descriptor of an aircraft type, and where the risk data is further based on the aircraft type.

Clause 4 includes the method of any of Clauses 1-3, wherein the micro-weather model includes a machine-learning model configured to receive input based on the meteorologic data and configured to generate output, and wherein the output includes estimates of a plurality of local wind fields within the first geographic area.

Clause 5 includes the method of any of Clauses 1-4, wherein the micro-weather model includes parameters for calculating, based on the meteorologic data, estimates of a plurality of local wind fields within the first geographic area.

Clause 6 includes the method of any of Clauses 1-5, wherein the micro-weather model indicates predetermined estimates of a plurality of local wind fields within a third geographic area, wherein the topographic parameters of the third geographic area are a closest match, based on the comparison, to the topographic parameters of the first geographic area.

Clause 7 includes the method of any of Clauses 1-6, wherein the first geographic area represents an area corresponding to one city block or less, and the second geographic area represents an area corresponding to at least a neighborhood or city that contains the first geographic area.

Clause 8 includes the method of any of Clauses 1-7, wherein the topographic parameters include descriptions of buildings, descriptions of streets, descriptions of land usage, descriptions of land surface topology, or any combination thereof.

Clause 9 includes the method of any of Clauses 1-8, wherein selecting a micro-weather model includes selecting a third geographic area that is similar to the first geographic area based on the topographic parameters of the first geographic area and corresponding topographic parameters of the third geographic area.

Clause 10 includes the method of Clause 9, the method further including estimating, based on the micro-weather model and the meteorologic data for the second geographic area, local wind fields for the third geographic area. The method also includes performing one or more data transformation operations to map the local wind fields for the third geographic area to the first geographic area.

Clause 11 includes the method of any of Clauses 1-10, wherein the risk data includes a plurality of risk values for the first geographic area.

Clause 12 includes the method of Clause 11, wherein the risk data includes a respective risk value for each grid section of a plurality of grid sections of the first geographic area, and wherein the plurality of grid sections represent laterally offset subregions of the first geographic area.

Clause 13 includes the method of Clause 11 or Clause 12, wherein the risk data includes a respective risk value for each layer of a plurality of layers of the first geographic area, and wherein the plurality of layers represent vertically offset air volumes associated with the first geographic area.

Clause 14 includes the method of any of Clauses 1-13, wherein at least a subset of the plurality of predetermined micro-weather models are generated using computational fluid dynamics analysis of one or more third geographic areas based on topographic parameters associated with the one or more third geographic areas and meteorological data associated with one or more fourth geographic areas, wherein each of the one or more third geographic areas is smaller than and entirely bounded by a respective one of the one or more fourth geographic areas, and wherein the first geographic area is distinct from each of the one or more third geographic areas.

Clause 15 includes the method of Clause 14, wherein the second geographic area is distinct from each of the one or more fourth geographic areas.

According to Clause 16, a computer-readable storage device stores instructions that, when executed by one or more processors, cause the one or more processors to perform operations including receiving data indicating a first geographic area. The operations also include obtaining meteorologic data for a second geographic area, wherein the first geographic area is smaller than and entirely bounded by the second geographic area. The operations also include determining topographic parameters associated with the first geographic area. The operations also include performing a comparison of the topographic parameters associated with the first geographic area to topographic parameters associated with a plurality of predetermined micro-weather models. The operations also include selecting a micro-weather model from among the plurality of predetermined micro-weather models based on the comparison. The operations also include determining, based on the meteorologic data for the second geographic area and the micro-weather model, risk data indicative of risk of particular meteorological conditions in the first geographic area.

Clause 17 includes the computer-readable storage device of Clause 16, wherein at least a subset of the plurality of predetermined micro-weather models are generated using computational fluid dynamics analysis of one or more third geographic areas based on topographic parameters associated with the one or more third geographic areas and meteorological data associated with one or more fourth geographic areas, wherein each of the one or more third geographic areas is smaller than and entirely bounded by a respective one of the one or more fourth geographic areas, and wherein the first geographic area is distinct from each of the one or more third geographic areas.

Clause 18 includes the computer-readable storage device of Clause 16 or Clause 17, wherein the operations further include obtaining a descriptor of an aircraft type, and where the risk data is further based on the aircraft type.

According to Clause 19, a computing device includes one or more processors configured to receive data indicating a first geographic area. The one or more processors are also configured to obtain meteorologic data for a second geographic area, wherein the first geographic area is smaller than and entirely bounded by the second geographic area. The one or more processors are also configured to determine topographic parameters associated with the first geographic area. The one or more processors are also configured to perform a comparison of the topographic parameters associated with the first geographic area to topographic parameters associated with a plurality of predetermined micro-weather models. The one or more processors are also configured to select a micro-weather model from among the plurality of predetermined micro-weather models based on the comparison. The one or more processors are also configured to determine, based on the meteorologic data for the second geographic area and the micro-weather model, risk data indicative of risk of particular meteorological conditions in the first geographic area.

Clause 20 includes the computing device of Clause 19, wherein the one or more processors are further configured to generate a graphical user interface representing at least the first geographic area and visually distinguishing, in the graphical user interface, a first portion of the first geographic area that is indicated in the risk data to be associated with a first risk level from a second portion of the first geographic area that is indicated in the risk data to be associated with a second risk level.

What is claimed is:

1. A computer-implemented method comprising:
receiving, by a processor, a request for a risk value categorization for an operation of an aerial vehicle;
receiving, by the processor, data indicating a first geographic area;
obtaining, by the processor, meteorologic data for a second geographic area, wherein the first geographic area is smaller than and entirely bounded by the second geographic area;
determining, by the processor, topographic parameters associated with the first geographic area;
performing, by the processor, a comparison of the topographic parameters associated with the first geographic area to topographic parameters associated with a plurality of predetermined micro-weather models;
selecting, by the processor, a micro-weather model from among the plurality of predetermined micro-weather models based on the comparison;
determining, by the processor and based on the meteorologic data for the second geographic area and the micro-weather model, risk data indicative of risk of particular meteorological conditions in the first geographic area;

generating the risk value categorization based at least on the risk data; and transmitting the risk value categorization in response to the request.

2. The method of claim 1, further comprising generating, by the processor, a graphical user interface representing at least the first geographic area and visually distinguishing, in the graphical user interface, a first portion of the first geographic area that is indicated in the risk data to be associated with a first risk level from a second portion of the first geographic area that is indicated in the risk data to be associated with a second risk level.

3. The method of claim 1, further comprising obtaining, by the processor, a descriptor of an aircraft type, and where the risk data is further based on the aircraft type.

4. The method of claim 1, wherein the micro-weather model includes a machine-learning model configured to receive input based on the meteorologic data and configured to generate output, and wherein the output includes estimates of a plurality of local wind fields within the first geographic area.

5. The method of claim 1, wherein the micro-weather model includes parameters for calculating, based on the meteorologic data, estimates of a plurality of local wind fields within the first geographic area.

6. The method of claim 1, wherein the micro-weather model indicates predetermined estimates of a plurality of local wind fields within a third geographic area, wherein the topographic parameters of the third geographic area are a closest match, based on the comparison, to the topographic parameters of the first geographic area.

7. The method of claim 1, wherein the first geographic area represents an area corresponding to one city block or less, and the second geographic area represents an area corresponding to at least a neighborhood or city that contains the first geographic area.

8. The method of claim 1, wherein the topographic parameters include descriptions of buildings, descriptions of streets, descriptions of land usage, descriptions of land surface topology, or any combination thereof.

9. The method of claim 1, wherein selecting a micro-weather model includes selecting a third geographic area that is similar to the first geographic area based on the topographic parameters of the first geographic area and corresponding topographic parameters of the third geographic area.

10. The method of claim 9, further comprising:
estimating, by the processor, based on the micro-weather model and the meteorologic data for the second geographic area, local wind fields for the third geographic area; and
performing, by the processor, one or more data transformation operations to map the local wind fields for the third geographic area to the first geographic area.

11. The method of claim 1, wherein the risk data includes a plurality of risk values for the first geographic area.

12. The method of claim 11, wherein the risk data includes a respective risk value for each grid section of a plurality of grid sections of the first geographic area, and wherein the plurality of grid sections represent a respective plurality of subregions of the first geographic area laterally offset from one another.

13. The method of claim 11, wherein the risk data includes a respective risk value for each layer of a plurality of layers of the first geographic area, and wherein the plurality of layers represent vertically offset air volumes associated with the first geographic area.

14. The method of claim 1, wherein at least a subset of the plurality of predetermined micro-weather models are generated using computational fluid dynamics analysis of one or more third geographic areas based on topographic parameters associated with the one or more third geographic areas and meteorological data associated with one or more fourth geographic areas, wherein each of the one or more third geographic areas is smaller than and entirely bounded by a respective one of the one or more fourth geographic areas, and wherein the first geographic area is distinct from each of the one or more third geographic areas.

15. The method of claim 14, wherein the second geographic area is distinct from each of the one or more fourth geographic areas.

16. A computer-readable storage device storing instructions that when executed by one or more processors cause the one or more processors to perform operations comprising:
receiving a request for a risk value categorization for an operation of an aerial vehicle;
receiving data indicating a first geographic area;
obtaining meteorologic data for a second geographic area, wherein the first geographic area is smaller than and entirely bounded by the second geographic area;
determining topographic parameters associated with the first geographic area;
performing a comparison of the topographic parameters associated with the first geographic area to topographic parameters associated with a plurality of predetermined micro-weather models;
selecting a micro-weather model from among the plurality of predetermined micro-weather models based on the comparison;
determining, based on the meteorologic data for the second geographic area and the micro-weather model, risk data indicative of risk of particular meteorological conditions in the first geographic area;
generating the risk value categorization based at least on the risk data; and
transmitting the risk value categorization to the user in response to the request.

17. The computer-readable storage device of claim 16, wherein at least a subset of the plurality of predetermined micro-weather models are generated using computational fluid dynamics analysis of one or more third geographic areas based on topographic parameters associated with the one or more third geographic areas and meteorological data associated with one or more fourth geographic areas, wherein each of the one or more third geographic areas is smaller than and entirely bounded by a respective one of the one or more fourth geographic areas, and wherein the first geographic area is distinct from each of the one or more third geographic areas.

18. The computer-readable storage device of claim 16, wherein the operations further comprise obtaining a descriptor of an aircraft type, and where the risk data is further based on the aircraft type.

19. A computing device comprising:
one or more processors configured to:
receive a request for a risk value categorization for an operation of an aerial vehicle;
receive data indicating a first geographic area;

obtain meteorologic data for a second geographic area, wherein the first geographic area is smaller than and entirely bounded by the second geographic area;

determine topographic parameters associated with the first geographic area;

perform a comparison of the topographic parameters associated with the first geographic area to topographic parameters associated with a plurality of predetermined micro-weather models;

select a micro-weather model from among the plurality of predetermined micro-weather models based on the comparison;

determine, based on the meteorologic data for the second geographic area and the micro-weather model, risk data indicative of risk of particular meteorological conditions in the first geographic area;

generate the risk value categorization based at least on the risk data; and transmit the risk value categorization in response to the request.

20. The computing device of claim 19, wherein the one or more processors are further configured to generate a graphical user interface representing at least the first geographic area and visually distinguishing, in the graphical user interface, a first portion of the first geographic area that is indicated in the risk data to be associated with a first risk level from a second portion of the first geographic area that is indicated in the risk data to be associated with a second risk level.

* * * * *